Nov. 3, 1964 B. G. MAGNUSSON 3,155,842

CURRENT REGULATING ARRANGEMENT FOR COINCIDENCE MEMORIES

Filed May 15, 1961 2 Sheets-Sheet 1

INVENTOR
BENGT GUNNAR MAGNUSSON

BY Hane and Nydick
ATTORNEYS

Nov. 3, 1964 B. G. MAGNUSSON 3,155,842

CURRENT REGULATING ARRANGEMENT FOR COINCIDENCE MEMORIES

Filed May 15, 1961 2 Sheets-Sheet 2

INVENTOR
BENGT GUNNAR MAGNUSSON
BY Hane and Nydick
ATTORNEYS

United States Patent Office 3,155,842

Patented Nov. 3, 1964

3,155,842
CURRENT REGULATING ARRANGEMENT FOR COINCIDENCE MEMORIES

Bengt Gunnar Magnusson, Enskede, Sweden, assignor to Telefonaktiebolaget L M Ericsson, Stockholm, Sweden, a corporation of Sweden Filed May 15, 1961, Ser. No. 110,156
Claims priority, application Sweden, May 24, 1960
1 Claim. (Cl. 307—88.5)

In coincidence memories in electronic data machines certain demands must be made upon the so called reading and writing currents or co-ordinate currents, which are transmitted through memory elements of the memories, for instance ferrite cores. Among these demands there may be mentioned a reproduceable shape of a curve, which as far as possible is independent of the information unit of the memory and has the most possible constant amplitude during reading and writing respectively. Further the loss effects must be held at a reasonable level as for instance it is possible to make essential savings with a reduced current consumption in automatic telephone exchanges.

The reading and writing currents must have a reproduceable shape of a curve independent of the information unit of the memory, for instance, so that the cores of the memory, which shall give signals at the same time, really do so at exactly the same time. An amplitude of the reading and writing currents independent of the actual load is required for instance, in order to eliminate the disturbing voltages emitted by ferrite cores. In order to have the current values suitably adjusted to the temperature qualities of the ferrite cores, the currents should be compensated with respect to temperature.

The present invention relates to an arrangement for regulation and stabilization of the reading and writing currents in a coincidence memory in an electronic data machine, such as en electronic automatic telephone exchange.

The invention is mainly characterized by a chopper arrangement, consisting of a comparator with two comparison elements connected in a comparison circuit, for instance transistors, a connecting circuit built of logical circuit elements and at least two switch elements, one of which, for instance a transistor, is connected to a higher potential, and one of which, for instance a diode, is connected to a lower potential. Said comparator is arranged to test current flowing through the inductance elements of the integration circuit and, if its level during the intervals between the reading and writing phases is too low, temporarily and automatically raise the voltage across the inductance element by connecting said switch element connected to a higher potential to the inductance element, whereby the current flowing through the inductance element is restored to its original level, but otherwise connect said switch element connected to the lower potential to the inductance element of the integration circuit.

Figure 1:
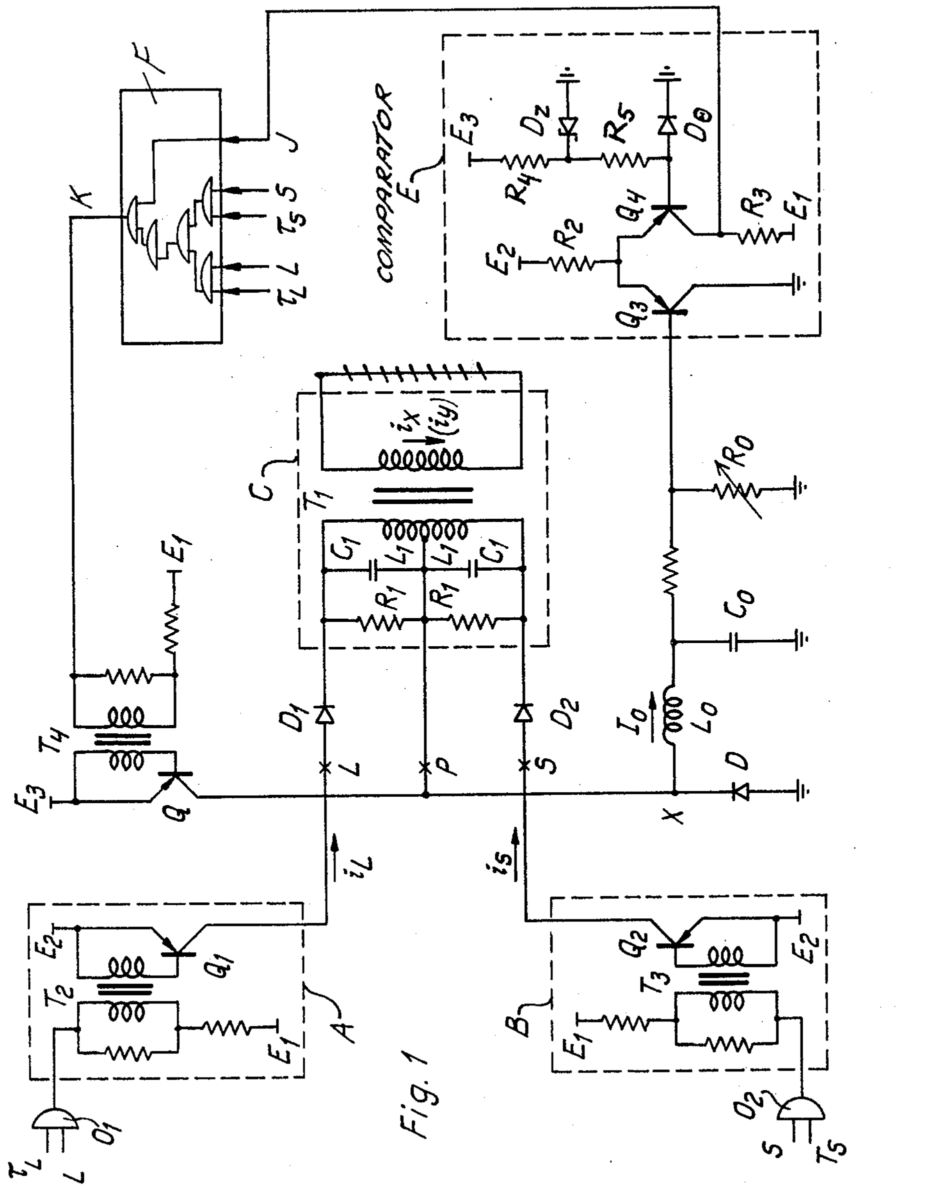
Figure 2:
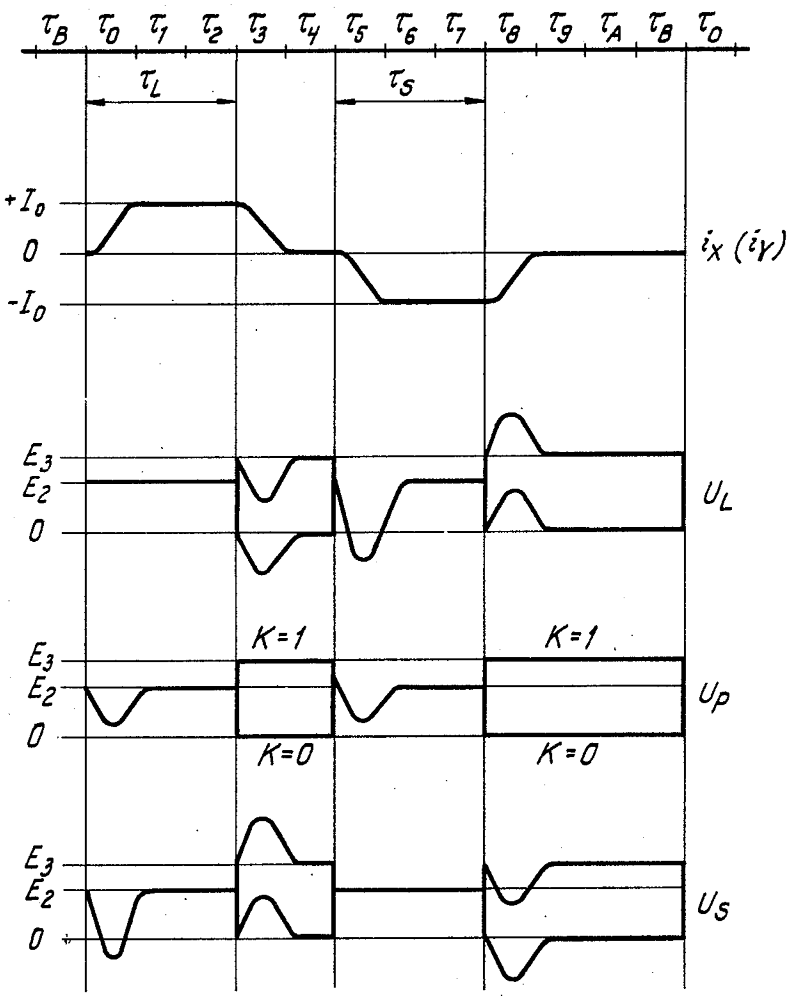

One embodiment of the arrangment according to the invention will be described below in connection with the figures, of which FIG. 1 shows a diagram of a circuit system according to the invention, and FIG. 2 shows an example of a time diagram for the system according to FIG. 1 in combination with a coincidence memory.

In FIG. 1, A and B indicate driving pulse amplifiers of a type known per se, which supply current to all the X- and/or Y-co-ordinate lines of a memory matrix via a connecting arrangement. The connecting arrangement C comprises, for instance a transistor $T_1$, through the primary winding of which the currents supplied by the driving pulse amplifiers A and B pass. All the X- and/or Y-co-ordinate lines are connected to the secondary side of the transformer $T_1$, which lines pass the memory element of the memory matrix, which is supposed to consist of ferrite cores in the embodiment. By making use of the transformer connection a rapid action is achieved at the same time as the number of necessary feeding voltages can be kept low. Further, the arrangment in FIG. 1 comprises a chopper arrangement consisting of two switch elements Q, for instance a transistor, and D, for instance a rectifier and of a comparator E and a connecting circuit F. Finally, the arrangement also includes an integration circuit, which consists of an inductance $L_0$, a resistance $R_0$ and optionally a capacitance $C_0$.

An example of a time diagram for a coincidence memory combined with an arrangement according to FIG. 1 is shown in FIG. 2. The diagram comprises a so called memory cycle, the duration of which is for instance of the magnitude of some micro-seconds. The memory cycle is supposed to be divided into 12 time intervals of the same length indicated $\tau_0$–$\tau_9$, $\tau_A$ and $\tau_B$. The interval $\tau_0$–$\tau_2$ is a so called reading phase $\tau_L$, during which the contents of the memory can be read, while $\tau_5$–$\tau_7$ is a so called writing phase $\tau_S$, during which the writing of information in the memory can take place.

FIG. 2 shows the shape of the curve an the size of the co-ordinate currents $i_x$ and $i_y$ through the X- and Y-co-ordinate lines and also the size of the voltages $u_L$, $u_P$ and $u_S$ in relation to ground at the points L, P and S respectively in the connecting arrangement C in FIG. 1.

The arrangement in FIG. 1 operates as follows:

When information is to be read from or written into the memory, the driving pulse amplifier A and the driving pulse amplifier B respectively supply current pulses $i_L$ and $i_S$ to the connecting arrangement C in a way which will be described below. In the secondary winding of the transformer $T_1$ said co-ordinate currents $i_x$ and $i_y$ are then induced. These semi-currents form the semi-currents, which are transmitted through the ferrite cores of the memory matrix in the $x$- and $y$-line respectively, and form the said reading and writing currents respectively. To enable these currents to satisfy the demands mentioned in the introduction, the current pulse $i_L$ and $i_S$ are regulated to exact values by means of for instance the integration circuit $L_0C_0R_0$. The regulation is achieved by providing that a constant mean current $I_0$ is constantly flowing through the inductance element $L_0$ of the integration circuit. During the reading of the memory the current $I_0$ consists of the current pulse $i_L$ and during the writing of information in the memory it consists of the current pulse $i_S$. During short time intervals, when neither reading nor writing of information occurs in the memory, the current $I_0$ consists of a current, which develops when the energy stored in the inductance $L_0$ is discharged whereby the discharging current path consists for instance, of the rectifier D, the inductance $L_0$ and the resistance $R_0$. During long intervals between the reading and writing phases, when the energy stored in the inductance $L_0$ is not sufficient to maintain the current $I_0$ at a desired level, the transistor Q is connected to the inductance by aid of the comparator E and the connecting circuit F so often that the current $I_0$ is kept substantially constant through the inductance, by temporarily raising the potential $u_P$ at one terminal point of the inductance with each connection of the transistor Q. Consequently, the current $I_0$ will be equal to the stationary top value of the reading and writing pulses $i_L$ and $i_S$ and the current $I_0$ is determined by the mean voltage between the point X and ground divided by the total series resistance through the integration circuit between these two points. The feeding voltages for the arrangement in FIG. 1 are symbolized by $E_1$, $E_2$ and $E_3$, and for them $E_3 > E_2 > 0$ (ground) $> E_1$ is valid.

During each so called reading phase $\tau_L$ in FIG. 2, reading of the memory can take place, and therefore a voltage is applied during this phase to one of the inlets of an "and" circuit $O_1$ connected to the driving pulse amplifier A in FIG. 1, for instance from a clock-generator. Whether reading really shall be effected or not during a certain reading phase is then determined, or if there is a reading pulse L or not at the second inlet of the "and" circuit $O_1$ at the same time. If such be the case, a signal is obtained on the outlet of the "and" circuit $O_1$, at which the driving pulse amplifier A, which in a known way consists of, for instance, a transistor $Q_1$ and a transformer $T_2$, supplies a current pulse $i_L$ to the connecting arrangement C via a diode $D_1$. The reading pulse L can for instance appear from a special information memory or something like that.

Another "and" circuit $O_2$ is similarly connected to the driving pulse amplifier B. The "and" circuit voltage from for instance a clock-generator is connected to one inlet of the "and" circuit during every writing phase $\tau_S$ in FIG. 2. When the writing of information in the memory shall take place, a voltage is connected to the second inlet of the "and" circuit $O_2$ at the same time in form of a writing pulse S. In doing so a signal is obtained at the outlet of the "and" circuit $O_2$. The driving pulse amplifier B, which in a known way includes, for instance, a transistor $Q_2$ and a transformer $T_3$, supplies a current pulse $i_S$ to the connecting arrangement C via a diode $D_2$.

The current pulses $i_L$ and $i_S$ from the driving pulse amplifiers A and B respectively pass the primary winding of the transformer $T_1$ in the connecting arrangement C in opposite phase, and in the secondary winding said coordinate currents $i_x$ and $i_y$ are induced.

When for instance reading of the memory occurs, the driving pulse amplifier A supplies a current pulse $i_L$, according to what is mentioned above, which current pulse passes via the connecting arrangement C to the integration circuit $L_0C_0R_0$. The primary winding of the transformer $T_1$ in the connecting arrangement C is provided with a center tap, at which each winding half is connected parallel to a resistance $R_1$ and a capacitance $C_1$. Two parallel resonance circuits $L_1C_1R_1$ are thus obtained, where $L_1$ represents the total inductance value on to the primary side of the transformer $T_1$ for semi-currents of the ferrite cores connected to the secondary side. When the current pulse $i_L$, which in the best case will be a square wave, passes the parallel resonance circuit $L_1C_1R_1$, the current edges will be mainly aperiodically damped. In this way the parallel resonance circuit $L_1C_1R_1$ will consequently control the rise time of the current pulse $i_x(i_y)$ and the overshoots, if any.

The amplitude of the current pulse $i_L$ and also $i_x(i_y)$ are determined by the integration circuit $L_0C_0R_0$. The amplitude determination is made possible by having a current $I_0$, with mainly the amplitude that is desired for the current pulse $i_L$, permanently flowing through the inductance $L_0$. When the reading conditions are satisfied and the driving pulse amplifier A is connected to the connecting arrangement C, the current pulse $i_L$ will block the diode D and the current $I_0$ will consist of the current pulse $i_L$. Owing to the inertia of the integration circuit $L_0C_0R_0$ and in particular the inertia of the inductance $L_0$, a sudden change of the current $I_0$ cannot occur, but instead the integration circuit will constitute a current holding arrangement, which means that the current pulse $i_L$ will maintain the amplitude $I_0$.

During writing of information into the memory, the driving pulse amplifier B will, as mentioned above, supply a current pulse $i_x(i_y)$ in opposite direction in relation to the reading phase, the amplitude, the rise time and overshoot of which are determined in the same way as for corresponding magnitudes of the current pulse during the reading phase.

Even during the intervals which arise in the memory cycle between the reading and writing phases, and when none of the driving pulse amplifiers A and B are connected to the connecting arrangement C, a current $I_0$ will permanently flow through the inductance $L_0$. During such short intervals, for instance, the time interval $\tau_3-\tau_4$ in FIG. 2, which have a duration of the magnitude of one microsecond, the current $I_0$ can be maintained by discharging the energy which is stored in the inductance $L_0$ through a current path, in which are included the diode D, which is connected to a potential lower than $E_2$, for instance, ground, the inductance $L_0$ and the resistance $R_0$. If the inductance $L_0$ and the resistance $R_0$ are dimensioned in a suitable way, for example, a sufficiently long time constant in relation to the length of the time interval, the energy discharge will be limited to a value such that the current $I_0$ will not decrease appreciably below the desired level.

With long intervals between the reading and writing phases in the memory cycle, the integration circuit $L_0C_0R_0$ will have time to be discharged so much that the current $I_0$ would decrease considerably towards the value 0, if no special steps are taken. According to the present invention the current $I_0$ is kept at the original level by temporarily and automatically raising the potential at one terminal point X in FIG. 1 over the ground potential when the current $I_0$ has decreased below a certain value determined in advance, at which the current reverts to the original level. The potential raise in the point X occurs automatically by aid of the comparator E, the connecting circuit F and the switch element Q, which latter comprises one transistor in the shown example of embodiment.

The comparator E consists of two comparison elements, for instance, transistors $Q_3$ and $Q_4$, arranged in a comparison circuit. The base electrode of the transistor $Q_3$ receives its control voltage over the resistance $R_0$, which voltage is consequently determined by the current $I_0$. Further the transistor $Q_4$ receives its control voltage over a reference element, for instance a diode. In the shown embodiment a zener-diode $D_Z$ is connected to a potential divider determining the bias of the transistor $Q_4$, in which besides the reference element $D_0$ the resistances $R_4$ and $R_5$ are included, whereby said bias is stabilized.

The control voltages are equally adjusted at the two transistors $Q_3$ and $Q_4$, at which the current through the common emitter resistances $R_2$ of the two transistors is so divided that equally large parts of the current pass through each transistor. If the current $I_0$ through the inductance $L_0$ decreases, the action of the base electrode of the transistor $Q_3$ will decrease, whereupon a small part of the current through the emitter resistance $R_2$ passes through the transistor $Q_4$. Hereby a small voltage drop is obtained across the collector resistance $R_3$ of this transistor, and the voltage on the collector electrode of the transistor decreases to a more negative value. This voltage decrease is supplied to the connecting circuit F via a conductor J.

The connecting circuit F includes a number of logical circuit elements, known per se, for instance, two "and" circuits + one "or" circuit + one inverting circuit + one "and" circuit, with for instance five inlets together, symbolized in FIG. 1 by $\tau_L$, L, $\tau_S$, S and J, and one outlet symbolized by K.

A raise of the potential in the point X will occur only during the long time intervals, for instance, $\tau_8-\tau_B$ in FIG. 2, or between two memory cycles which are far from each other in time, when neither the reading nor the writing conditions are present, and when the energy stored in the inductance $L_0$ is not sufficient to maintain the current $I_0$ at the original level. A potential raise during only these time intervals is achieved by providing the inlets of the connecting circuit F with the specific conditions for said time interval. Two inlets of the connecting circuit are supplied with the pulses $\tau_L$ and $\tau_S$ supplied by the clock-generator during the reading and writing phases respectively, while two of the other inlets are supplied with the reading and writing pulses L and S respectively supplied by, for instance, a special instruction memory. These four different pulses are consequently the same that are supplied to the "and" circuits $O_1$ and $O_2$ at the driving pulse amplifiers A and B respectively. The fifth inlet of the connecting circuit F is supplied with the possible voltage decrease in the comparator E via the conductor J. By suitable connection of said logical circuit elements included in the connecting circuit F a signal can be obtained at the outlet K of the connecting circuit F only when the afore-stated conditions are present. The potential in the point X shall be increased only when the current $I_0$ has decreased below a value determined in advance, that is, when the comparator E supplies a sufficiently negative voltage to the conductor J, and at the same time neither the driving pulse amplifier A nor the driving pulse amplifier B feeds current to the connecting circuit C. The specific conditions on the inlets of the connecting circuit F will then be with circuit logical expressions that J shall be equal to "1" but $\tau_L$ and L may not be "1" at the same time, and neither may $\tau_S$ and S be "1" at the same time. When these conditions are present an outlet voltage on the outlet K of the connecting circuit is obtained. This voltage is supplied to the base electrode of the transistor Q via a transformer $T_4$ and makes the transistor conductive. The voltage decrease across a conductive transistor is low, and therefore, when the transistor Q is conductive, the potential in the point X will rise to a value near the emitter potential of the transistor Q. When the current $I_0$ has reverted to its original value the voltage, which is passed to the conductor J from the comparator E, disappears. The condition J="1" is no longer present for the connecting circuit F and therefore the voltage at its outlet K disappears and the transistor Q is blocked. If the remaining conditions are maintained at the inlets of the connecting circuit F, the cycle is repeated as soon as the condition J="1" appears again, that is, when the current $I_0$ has decreased again below the original value. If the sensitivity of the comparator E is made sufficiently high, the difference between the two limit values on $I_0$ can be lower than, for instance, 1%, that is, $I_0$ is practically constant.

The arrangement according to the invention can advantageously be provided with an arrangement for temperature compensation of the current $I_0$ flowing through the inductance $L_0$. At an increased temperature of the surroundings the co-ordinate currents $i_x$ and $i_y$ through the ferrite cores of the memory matrix will be smaller, whereby also the current $I_0$, which according to the above mentioned determines the amplitude of the co-ordinate currents $i_x$ and $i_y$, shall be lower. Said temperature compensation is achieved by, for instance, using a diode as reference element $D_0$, suitably a silicone diode, with the same temperature dependence as the ferrite cores in the memory matrix. At an increased temperature the control voltage of the transistor $Q_4$ will decrease somewhat and the current $I_0$ through the inductance element $L_0$ will be adjusted to a somewhat lower value, so that the transistor $Q_3$ will have the same control voltage as the transistor $Q_4$.

I claim:

A current-regulating circuit system for electronic data-processing apparatus, said circuit system comprising an inductance means, a comparison circuit having an input and an output, a connecting network, a first switch means having a control terminal, and a second switch means, one terminal of said inductance means being connected to said switch means and the other terminal to the input of said comparison circuit, the output side of the comparison circuit being connected to the input of the connecting network, said first switch means being connected to a first potential, and the control terminal of said first switch means being connected to the output side of said connecting network, the second switch means being connected to a second potential lower than said first potential, said inductance means and said switch means having a common circuit point, and a source of current connected to said common point for supplying write-in and read-out current thereto at spaced intervals of time, said comparison circuit being controlled by the flow of current through said inductance means and in response to a flow of current below a predetermined level through said inductance means during periods of time of no-current supply from said source of current controlling said first switch means to connect said first potential to said common point, thereby to raise the potential through the inductance means during said periods of time, and controlling said second switch means in periods of current flow from the source of current to connect said second potential to said common point.

References Cited in the file of this patent

UNITED STATES PATENTS

| | | |
|---|---|---|
| 2,964,655 | Mann | Dec. 13, 1960 |
| 3,012,153 | Mussard | Dec. 5, 1961 |
| 3,013,159 | Sautels | Dec. 12, 1961 |

FOREIGN PATENTS

| | | |
|---|---|---|
| 577,117 | Canada | June 2, 1959 |